Dec. 23, 1924.
W. E. PEYTON
SEED POTATO CUTTING KNIFE
Filed June 20, 1924
1,520,436
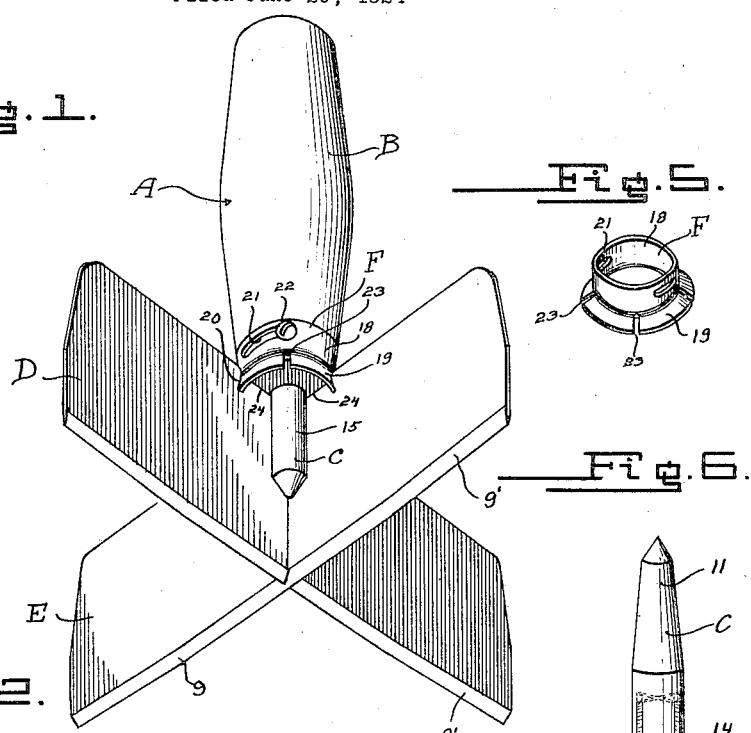
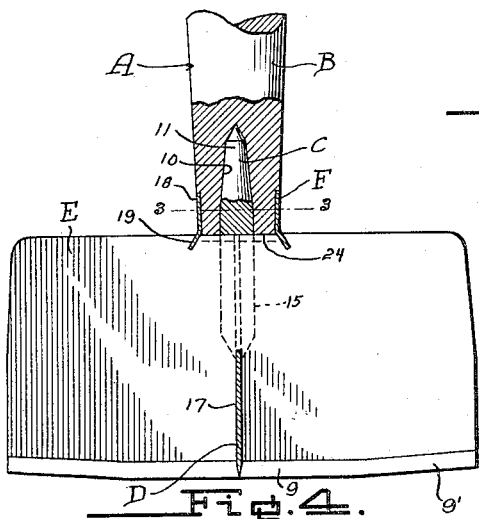
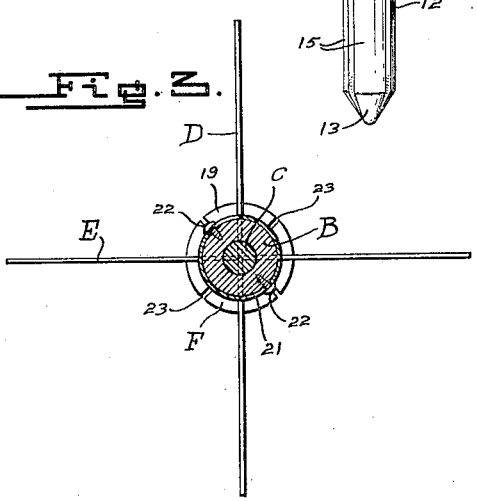
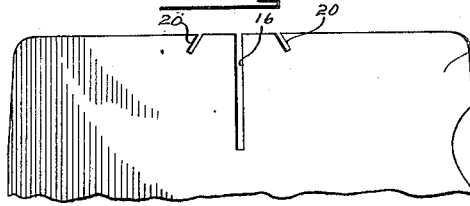
Inventor
William E. Peyton Patented Dec. 23, 1924.

1,520,436

UNITED STATES PATENT OFFICE.

WILLIAM E. PEYTON, OF ROBERTS, IDAHO.

SEED-POTATO-CUTTING KNIFE.

Application filed June 20, 1924. Serial No. 721,257.

*To all whom it may concern:*

Be it known that I, WILLIAM E. PEYTON, a citizen of the United States, residing at Roberts, in the county of Jefferson and State of Idaho, have invented certain new and useful Improvements in a Seed-Potato-Cutting Knife, of which the following is a specification.

The present invention relates to improvements in knives especially well adapted for use in cutting seed potatoes, and the primary object of the invention is to provide a novel device of the character described, wherein the blades may be easily and quickly removed from the handle portion when desiring to sharpen the cutting edges of the blades, or when desiring to use blades of different formation.

A further object of the invention is the provision of a novel retaining means for the interfitting blades of the cutting knife, whereby the blades will be effectively locked in an adjusted position with respect to the handle portion, and yet permitting of the ready removal of the blades from the handle.

Other objects and advantages of the invention will appear in the following detailed description, taken in connection with the accompanying drawing, forming a part of this specification, and in which drawing,—

Figure 1 is a perspective view of a knife constructed in accordance with my invention.

Figure 2 is a central vertical section through the lower portion of the same, showing the blades in a locked operative position.

Figure 3 is a horizontal section on the line 3—3 of Figure 2.

Figure 4 is a side elevation of the upper portion of one of the cutting blades and showing the slot arrangement provided in the upper marginal edge thereof.

Figure 5 is a perspective view of the improved locking ring, and

Figure 6 is an enlarged detail perspective view of an aligning pin forming a part of the invention.

Referring to the drawing in detail, and wherein like reference characters designate corresponding parts throughout the several views, the letter A designates my improved cutting knife comprising a handle B for receiving a blade aligning pin C; D and E interfitting cutting blades, and F means for retaining the blades D and E in adjusted operative position upon the handle B.

The handle B which may be made of wood, is preferably round in cross section and may have provided axially of its lower end, a tapered bore 10 for receiving the tapered shank 11 of the pin C. If desired, the shank of the pin may be provided with screw threads for threaded connection within the bore 10 of the handle.

The aligning pin C which is preferably made of metal, embodies in addition to the tapered shank 11, an axially projecting portion 12 which is preferably of conical formation at its outer free end as at 13. The free end of the portion 12 is divided by right angularly disposed, longitudinally extending slots 14, into spaced fingers 15 which are adapted to snugly engage the adjacent faces of the cutting blades when the blades are fitted into operative position within the slots 14 for retaining the blades in alignment beneath the handle portion B.

Referring to the blades D and E, both of which are flat and provided with cutting edges 9, sloping upwardly at their ends as at 9'; the blade D is provided centrally of its upper marginal edge with a vertically extending slot 16 for interfitting engagement with the upper central portion of the blade E, while the blade E is provided centrally of its lower or cutting edge with a vertically extending slot 17 for interfitting vertically engagement with the lower central portion of the blade D. These centrally disposed slots 16 and 17 which are of a width equal to the thickness of the blades D and E, extend for substantially one half the height of their respective blades for the purpose that when the blades are assembled into interfitting relation, the upper and lower edges of one blade will lie in an equal plane with the respective edges of its companion blade.

The means F for retaining the blades in adjusted operative position upon the handle B comprises an annular locking ring formed with a band 18 having an outwardly flared annular flange 19 provided at the lower end thereof for locking engagement in coaxially disposed inclined slots 20 provided in the upper marginal edges of the cutting blades adjacent their longitudinal centers. Circumferentially extending slots 21 are provided in the band 18, and through which fastening elements such as set screws 22 are adapted to pass for adjustably retaining the locking ring upon the lower end of the handle. The flared annular flange 19 which is adapted to extend below the lower end face of the handle, is provided with diametrically disposed blade receiving notches 23 which are adapted to be moved into registering alignment with the right angularly disposed grooves 24 formed in the lower end face of the handle portion when desiring to attach or remove the blades from the handle.

It will be seen that when the locking ring is moved circumferentially of the handle, the angular flange 19 will move into the inclined slots 20 for rigidly holding the blades in an operative position upon the handle, and when desiring to remove the blades for any purpose, the ring may be rotated in the opposite direction until the notches 23 align with the blades D and E. The set screws 22 are to be turned into frictional engagement with the band 18 for preventing further circumferential movement of the ring after being turned to a locked position upon the handle B. The transverse grooves 24 which are in alignment with the grooves 14, are adapted to receive a portion of the upper marginal edges of the cutting blades D and E for aiding in holding the blades in a rigid position when attached to the handle portion.

While the device has been shown as embodying two right angularly disposed cutting blades, it is to be understood that any desired number of blades may be substituted for that shown as the preferred embodiment of the invention.

It will also be apparent that the knife may be equally well employed as a household article for use in cutting slaw, tomatoes, apples, meats, etc., where a knife of this character would be much desired.

Changes in detail may be made without departing from the spirit or scope of the invention; but,

I claim:

1. In combination with a handle having an axially disposed aligning pin extending from the lower end thereof, interfitting blades having cutting edges, associated with said pin, and means rotatably carried by said handle independent of said pin adapted for interfitting locking engagement with said blades.

2. In combination with a handle having an axially disposed aligning pin extending from the lower end thereof, a pair of interfitting blades having cutting edges, associated with said pin, and a rotatable locking ring carried by the lower end of said handle having a flared portion adapted to move into interfitting locking engagement with said blades when the ring is moved circumferentially of the handle.

3. In combination with a handle having an axially disposed aligning pin extending from the lower end thereof, a pair of interfitting blades having cutting edges, associated with said pin and having slots provided in the upper portion thereof, and a rotatable locking ring carried by the lower end of the handle having a depending portion adapted to move into locking engagement with the slots in said blades when the ring is moved circumferentially of the handle.

4. In combination with a handle having an axially disposed aligning pin extending from the lower end thereof, a pair of interfitting blades having cutting edges, associated with said pin and having co-axially disposed inclined slots provided in the upper marginal edges thereof, and a rotatable locking ring carried by the lower end of the handle having a divided outwardly flared annular flange adapted to move into said inclined slots when the ring is moved circumferentially of the handle for retaining the blades in adjusted operative relation upon the handle.

5. In combination with a handle having an axially disposed aligning pin extending from the lower end thereof, a pair of interfitting blades having cutting edges, associated with said pin and having slots provided in the upper portion thereof, a rotatable locking ring carried by the lower end of the handle having a depending portion adapted to move into locking engagement with the slots in said blades when the ring is moved circumferentially of the handle, and means for retaining the locking ring in an adjusted position when moved into locking engagement with said blades.

6. A knife of the class described comprising a handle having transverse grooves provided in its lower end face, an aligning pin positioned axially in the lower end of the handle having a projecting portion provided with longitudinal slots aligning with the grooves in said handle, a pair of interfitting blades having cutting edges sloping upwardly at their ends, associated with said pin and having co-axially disposed inclined slots provided in the upper marginal edges thereof, an annular locking ring comprising a band provided with circumferentially extending slots, and having an outwardly flared annular flange provided at the lower end thereof adapted for locking engagement within the inclined slots of said blades, and means extending through the slots in said band for securing the locking ring to said handle and retaining the ring in an adjusted position when moved circumferentially of the handle into locking engagement with said blades.

WILLIAM E. PEYTON.